US011186019B2

(12) United States Patent
Seebacher

(10) Patent No.: US 11,186,019 B2
(45) Date of Patent: Nov. 30, 2021

(54) TOOL FOR THE INJECTION MOLDING OF PLASTIC MOLDED PARTS AND METHOD FOR MOVING A SLIDE OF A TOOL HALF OF THE TOOL

(71) Applicant: BRAUNFORM GMBH, Bahlingen (DE)

(72) Inventor: Georg Franz Seebacher, Sexau (DE)

(73) Assignee: BRAUNFORM GMBH, Bahlingen (DE)

( * ) Notice: Subject to any disclaimer, the term of this patent is extended or adjusted under 35 U.S.C. 154(b) by 163 days.

(21) Appl. No.: 16/814,167

(22) Filed: Mar. 10, 2020

(65) Prior Publication Data
US 2020/0290256 A1 Sep. 17, 2020

(30) Foreign Application Priority Data

Mar. 13, 2019 (DE) ...................... 10 2019 001 725.0

(51) Int. Cl.
*B29C 45/42* (2006.01)
*B29C 45/04* (2006.01)
(Continued)

(52) U.S. Cl.
CPC .......... *B29C 45/42* (2013.01); *B29C 45/0441* (2013.01); *B29C 45/1742* (2013.01);
(Continued)

(58) Field of Classification Search
CPC ............ B29C 45/2681; B29C 45/1742; B29C 33/305; B29C 33/306; B29C 45/42;
(Continued)

(56) References Cited

U.S. PATENT DOCUMENTS

2004/0222559 A1 11/2004 Gomes et al.
2018/0001524 A1 1/2018 Matsuda

FOREIGN PATENT DOCUMENTS

GB         1480744 A       7/1977
WO   WO-2010063812 A1 *  6/2010  ........... B29C 45/006
WO       2016124749 A1    8/2016

OTHER PUBLICATIONS

Search Report dated Jul. 16, 2020 in related/corresponding EP Application No. 20161912.9.
(Continued)

*Primary Examiner* — Robert B Davis
(74) *Attorney, Agent, or Firm* — Patent Portfolio Builders PLLC

(57) ABSTRACT

A tool for the injection molding of plastic molded parts has two tool halves movable in relation to each other, one of which has a mold plate carrying at least one mold insert with a multiplicity of mold cavities, or a mold plate with a mold insert support platen, which carries at least one mold insert with a multiplicity of mold cavities. The mold cavities are designed to form molded parts in conjunction with complementary cavities present on the second of the tool halves. The mold insert of each mold cavity is assigned a slide, which is arranged movably over or in a cavity-side surface of the mold insert. The slide has at least one guide element in engagement with a counterpart guide element in the mold insert. A connection bolt extends from the slide in the direction of the mold plate or of the mold insert support platen and is guided in a guide groove of a rotary ring. A plurality of connection bolts of a plurality of slides are arranged circumferentially along the circumference of the rotary ring, distributed in a corresponding number of guide grooves, and the rotary ring is connected to a drive ring arranged on the mold plate or the mold insert support platen.

12 Claims, 15 Drawing Sheets

(51) Int. Cl.
*B29C 45/17* (2006.01)
*B29C 45/26* (2006.01)
*B29C 45/40* (2006.01)

(52) U.S. Cl.
CPC ........ *B29C 45/2681* (2013.01); *B29C 45/401* (2013.01); *B29C 2045/4021* (2013.01)

(58) Field of Classification Search
CPC ............ B29C 45/0081; B29C 45/0441; B29C 2045/334; B29C 2045/0056; B29C 45/006
See application file for complete search history.

(56) References Cited

OTHER PUBLICATIONS

Search Results from related/corresponding DE Application No. 10 2019 001 725.0.

* cited by examiner

Section B-B

Section C-C

Section D-D

Section E-E

TOOL FOR THE INJECTION MOLDING OF PLASTIC MOLDED PARTS AND METHOD FOR MOVING A SLIDE OF A TOOL HALF OF THE TOOL

CROSS-REFERENCE TO RELATED APPLICATIONS

The present application claims priority under 35 USC § 119 to German Patent Application No. 10 2019 001 725.0, filed on Mar. 13, 2019, the entire disclosure of which is herein expressly incorporated by reference.

BACKGROUND AND SUMMARY OF THE INVENTION

Exemplary embodiment of the invention relate to a tool for the injection molding of plastic molded parts and to a method for moving a slide of a tool half of the tool for pivoting a portion of a molded part or for arranging a shaping portion in the cavity.

Injection molding tools for producing plastic molded parts are well-known from the prior art. It is also well-known that they usually have two tool halves that can be moved away from each other and together, namely a nozzle component and an ejector component, the latter having one or more mold inserts with the corresponding mold cavities for receiving the injection molding compound for molded parts. In the state when the tool components are brought together, one complete mold cavity is present that is closed. Molded parts consisting of two portions and connected by an injection-molded hinge can be injected in one piece and joined together before they are ejected as finished injection-molded parts. The one portion articulated on the hinge is pivoted over the other part and, for example, locked. The part to be pivoted could, for example, be a cover; the ejector component then accordingly has a covering slide with which the portion of the molded part that forms the cover is pivoted or "pushed" via a sliding movement. Accordingly, each mold cavity in the mold inserts is assigned a covering slide (or slide for short) which in each case is arranged next to a mold insert. In the prior art, the mold cavities are arranged in rows parallel to each other, and the slides can be pushed over the mold cavities.

The same applies to known mold slides which, as is known, are arranged just like, for example, covering slides.

On account of the parallel arrangement of the pairs of slides and cavities, the tool is very broad and requires a lot of space.

In known tools, the inserts also lie very far apart from each other, and the nozzle spacings are therefore very great. The flow paths in the hot runner block are therefore long. This results in long dwell times of the plastic in the hot runner block and, in addition, increased pressure is needed to fill the cavity.

Proceeding from this prior art, exemplary embodiments of the present invention are directed to a tool for the injection molding of plastic molded parts can be made more compact, in order to avoid the abovementioned disadvantages.

Exemplary embodiments are also directed to methods for more economic movement of a slide in a temperature-optimized and compact tool, with which, before the ejection of the injection-molded part, a pivotable portion of a one-piece molded part present in the ejector component can be pivoted, or of a mold slide, with which a shaping portion can be arranged for the injection molding in the cavity.

In a first embodiment of a tool according to the invention for the injection molding of plastic molded parts, which has two tool halves, namely a nozzle component and an ejector component, movable in relation to each other, provision is made that one of the two tool halves has a mold plate, which carries one or more mold inserts with a multiplicity of mold cavities, or that this first tool half has a mold plate and a mold insert support platen, which carries one or more mold inserts with a multiplicity of mold cavities. The mold cavities are designed in each case to form molded parts in conjunction with complementary cavities present on the other tool half. The mold insert has a slide assigned to each mold cavity, which slide is in each case arranged movably between two positions over a cavity-side surface of the mold insert.

The nozzle component has, in a manner known per se, a heatable nozzle through which a thermoplastic can be introduced as melt into the cavity.

The aforementioned mold cavities serve in particular to form moldings of identical shape.

Moreover, the slide has one or more guide elements which are in engagement with a counterpart guide element in the mold insert. A connection bolt extends from the slide in the direction of the mold plate or of the mold insert support platen and is guided in a guide groove of a rotary ring. In this case, the connection bolts of a plurality of slides are arranged circumferentially along the circumference of the rotary ring, distributed in a corresponding number of guide grooves. The rotary ring is connected to a drive ring arranged on the mold insert support platen.

The slide can be moved between two positions, namely a starting position spaced apart from the cavity, and an end position near the cavity. The slide provided for moving the injection-molded part or a portion of an injection-molded part adopts the starting position during the injection molding and is moved to the end position in order to move the injection-molded part or a portion of an injection-molded part. The slide designed as a mold slide with a shaping portion is arranged for the injection molding in the end position, in which the shaping portion of the slide projects into the cavity. In order to eject the molded part, the mold slide is moved back to the starting position.

In one embodiment in which additional mold insert support platens are present, a modular construction is advantageously permitted, which allows easier handling of the assembly.

The slide can, in each case, be moved between two positions over a cavity-side surface of the mold insert, or it can be moved within the mold insert, i.e., at least partially under the surface or recessed therein (as a so-called underfloor slide).

Advantageously, the slide can either be designed to move the molded part or a portion of the molded part or, as a mold slide, to project into the cavity with a shaping portion of the slide, for example in order to form holes, slits or undercuts, etc.

In a preferred embodiment, the tool half that has the mold inserts with the slides and their drive can be the ejector component. However, it is also conceivable in principle that a nozzle component has corresponding mold inserts with slides, particularly if these are mold slides, with their drive.

The specific arrangement of the slides with respect to the drive ring, wherein the slides can be oriented with their longitudinal direction according to chord portions circumferentially in relation to the rotary ring, permits a more compact component design, wherein the space-saving arrangement of the drive ring underneath the insert, instead of the hitherto customary arrangement next to or laterally within the insert, contributes to the compactness. By comparison with the prior art, the entire tool half can be made much smaller in width, with the same number of mold inserts and cavities, and takes up only a small height. This can be achieved in particular by the angled arrangement of the pairs of cavities and slides in each mold insert, which results from the distribution over the drive ring, thus providing optimal utilization of construction space. For example, with four pairs of cavities and slides, each pair of cavities and slides can be at an angle of 90° to an adjacent pair of cavities and slides, as it were in a kind of toothed arrangement. Advantageously, the flow paths in the hot runner block are thus additionally shortened, and the dwell times of the plastic in the hot runner block are thereby reduced. The gating of the cavities during the injection molding can be carried out with a radial side gate nozzle or any other suitable nozzle that is suited to the specific arrangement of the pairs of cavities and slides, as is the case in a radial side gate nozzle.

In a preferred embodiment of the tool, four slides can be provided per mold insert and can be moved by a common actuation device. The cavities are arranged in a manner analogous to the slides, i.e., in relation to the mold insert, radially around a center of the mold insert itself. The slides lie on a circular circumference, which corresponds to the circular circumference of the drive ring; the cavities lie on a circle with correspondingly smaller radius, wherein the imaginary center point of the circle is the same, namely the center point of the drive ring.

In a further embodiment of the tool according to the invention, the molded parts are one-piece molded parts. Within the meaning of the invention, "one-piece" means that each molded part consists of one casting, which is to say that several portions do not first of all have to be joined together but are instead connected from the outset. Thus, molded parts are possible with several portions which are connected by struts or thin-walled regions (film hinges). Preferably, the molded parts can have two or more portions, wherein one portion or several portions is/are connected to a second, further portion via a hinge. In this case, the slide is designed to pivot the second portion connected to the hinge: it is thus a so-called covering slide.

In yet another embodiment of the tool according to the invention, the slide is designed to slide a shaping portion of the slide into the cavity for injection molding. Mold slides are thus also to be used with the tool according to the invention. The mold slides permit the formation of one-piece molded parts with holes, slits, undercuts, etc.

The slide has one or more guide elements that are in engagement with a counterpart guide element in the mold insert, wherein the connection bolt extends from the slide in the direction of the mold plate or mold insert support platen. In the simplest configuration, the mounting of the connection bolt in the guide groove can be effected for example by a rounding of the bolt end, such that the rounded bolt runs in the track made available by the guide groove.

In a preferred embodiment, the connection bolt, for improved mounting in the guide groove of the rotary ring, has a roller bearing that is guided in the guide groove. Alternatively or in addition, in yet another embodiment of the tool according to the invention, each slide, at the end of the connection bolt directed away from the end guided in the guide groove, i.e., the rounded end or the roller bearing, has a horizontally extending slide part with a slide tip, preferably a slide tip having a slide fork with slide tines. In this way, the slide can travel around ejector pins, for example. Here, "travel around" means that one fork tine to the right and one fork tine to the left "travels" past or is pushed past the ejector pin.

The slide tip is rounded, such that the freshly injection-molded parts are not damaged if the slide tip touches or moves the molded parts.

In a further embodiment of the tool according to the invention, rotary ring and drive ring can be separately manufactured components, which are connected to each other. However, rotary ring and drive ring can also be integrally connected, i.e., produced as a one-piece ring component which has a rotary ring portion and a drive ring portion.

Generally, the ejector component can thus have ejector pins which, after the molded part has been cast, can be driven out of the cavity-side surface of the mold insert, wherein the slide is in each case designed in such a way that it can travel around the ejector pins in an ejection state. That is to say, as has been described above, a slide provided for covering the molded part can be configured with tines in order to travel around the ejector pins, which lift the cover portion of the molded part. In a mold slide which, during the injection molding, is located in the end position in which the shaping portion projects into the cavity, the arrangement of the ejector pins can be adapted to this shaping portion such that, during the demolding, the ejector pins do not collide with the slide when the slide moves up.

Moreover, in a further embodiment of the tool according to the invention, provision is made that the slide is mounted linearly movably in a rail guide as counterpart guide element, and the mold insert has grooves corresponding in their orientation to that of the rail guide, wherein the connection bolts of the slides are guided in these grooves, additionally to the guiding with the roller bearings in the guide grooves of the rotary ring. In this way, a linear guided movement is permitted, which permits a rapid advance of the slide without jamming.

The arrangement, distribution, extent and course of the guide grooves on the rotary ring depend on the intended slide strokes, which may also be different, for example if the mold insert has a large cavity with four different contours, which necessitates different strokes. However, if it is a mold insert with several symmetrically arranged cavities or cavity portions of the same kind, which all necessitate the same stroke, the plurality of connection bolts of the plurality of slides can be arranged circumferentially along the circumference of the rotary ring, distributed equidistantly from each other in a corresponding number of guide grooves.

The slides are integrated in each mold insert and can be operated jointly with a common actuation device. In this case, the slides are operatively coupled via the connection bolts to the actuation device lying behind the respective mold insert.

In a further embodiment of the tool according to the invention, provision is made that the drive ring is operatively coupled to a motor, wherein the drive ring has at least one toothed portion, which meshes with a drive rod of the motor. A toothed wheel or a toothed rod can thus engage in this toothed portion. The toothed rod and the toothed wheel are driven by a corresponding drive. For this purpose, a centrally guided drive rod can be provided behind the tool and is operatively connected to a motor. The drive rod is toothed in order to introduce force from the motor and introduce torque to rotary shafts. The toothing can be provided in individual portions, or the entire drive rod can be toothed. In one embodiment, the rotary shafts have two toothed wheels, which are connected to a shaft. A first toothed wheel takes over the movement of the drive rod and transmits it to the second toothed wheel, which then transmits the movement to the toothed portions of the drive ring.

The drive ring is rigidly connected to or produced in one piece with the rotary ring, as a result of which both can be jointly driven. The rotary ring has one or more grooves, which serve as tracks for the guide bolts. The grooves of the rotary ring are preferably curved, but they can also be differently shaped in order to realize any desired movement of the slides. Moreover, in the preferred embodiment, the connection bolts are provided with roller bearings, which are mounted in the grooves of the rotary ring. The roller bearings can be connected to the connection bolt via a mandrel, which has a thread. However, the connection bolt can also be mounted with a rounded end in the guide groove of the rotary ring without roller bearings.

To ensure that a movement of the slide on the surface of the mold insert can take place, the mold insert has, in a further embodiment of the tool according to the invention, rails and a correspondingly oriented groove, which limit the movement of the guide bolt. For this purpose, the guide element and the counterpart guide element form a rail guide. The counterpart guide element can be a groove in which the guide element as a spring engages, or vice versa. The guide rail as counterpart guide element can be shaped with a triangular cross section, in order to take up the movement forces of the slide and to better guide the latter. Besides a linear movement, these guide rails can also reproduce any other desired curve shape, e.g., a curve.

The mold region, i.e., the region in which the mold cavities lie, is located centrally with respect to the drive ring. For this purpose, the drive ring has a central bore, such that the drive ring is annular. The mold region can be mechanically supported by the side walls of the bore, in order also to guide tool closing and opening forces. In the mold region, in a further embodiment of the tool according to the invention, ejector pins are arranged underneath the mold cavities and can be driven out of the mold insert, perpendicularly with respect to the cavity-side surface of the mold insert, in order to release the finished mold part from the cavities and finally eject it.

In a method according to the invention, provision is made that, in order to move a slide of the corresponding (first) tool half of a tool according to the invention, the drive ring arranged on the mold plate or mold insert support platen is rotated together with the connected rotary ring, wherein the connection bolt, which is connected to the slide, is guided in the guide groove of the rotary ring, such that the slide is moved from a starting position to an end position by means of the guide element guided in the counterpart guide element. In this way, several slides of one mold insert, which can be arranged according to chord portions circumferentially in relation to the rotary ring in a space-saving manner, can be moved simultaneously.

In developments, the method according to the invention can be used to move a slide both in a tool for pivoting a portion of a one-piece molded part (covering slide) present in an ejector component and also in a tool for shaping the mold cavity (mold slide) in at least one of the two tool halves:

The method for pivoting a portion of a molded part in an ejector component is carried out with a one-piece molded part present, wherein the portion to be pivoted is a second portion that is connected to a first portion via a hinge, and comprises the following steps:

a) deploying the ejector pin, which is arranged under the second portion, and thereby releasing the second portion from the mold cavity;
b) moving the slide from its starting position by the method for moving the slide according to the invention, wherein
  the slide tip moves under the second portion of the molded part and sets the latter upright, and,
  during the continuous onward movement of the slide to the end position, the slide tines travel around the ejector pin and the slide tip folds the second portion of the molded part over and the slide tines travel over the second portion of the molded part such that the second portion of the molded part comes to lie on the first portion of the molded part,
c) moving the slide back to its starting position by rotating the drive ring in the opposite direction to step b), before the ejection of the molded part takes place by deployment of the ejector pins, which are present under the first portion of the molded part and thus release the molded part from the mold cavity.

At least two slide tines spaced apart from each other are in particular provided, wherein the distance between the slide tines is chosen such that a closure element of the molded part cover, e.g., a snap-fit lug or the like, is positioned between the tines when the slide tines move over the cover, such that said closure element does not tear off.

In the further method variant for configuring the mold cavity in at least one of the tool halves, i.e., the ejector component and/or the nozzle component, during the injection molding, a shaping portion of a slide is arranged in the cavity, wherein the arrangement of the slide is carried out by a method according to the invention for moving the slide. The slide, after the injection molding, is moved back to its starting position by rotation of the drive ring in the direction counter to that of arranging the slide in the cavity, before the ejection of the molded part takes place or, if the slides are present on the nozzle component, before the tool halves are moved apart.

The movement of the slide can, in this case, comprise a movement of the drive rod by means of the motor, wherein meshing of the at least one toothed portion of the drive ring and rotation of the drive ring and thus rotation of the rotary disk takes place, wherein, by interaction of the guides of the guide element in the counterpart guide element and of the roller bearing in the guide groove of the rotary ring from a starting position at the start of the groove to an end position at the end of the groove, the slide is moved linearly in the rail guide from its starting position to its end position. For the return movement to the starting position, the slide is accordingly moved counter to the drive rod of the motor.

If the drive ring is thus driven, the rotary ring also rotates. The slides are held laterally by the guide on the surface of the mold insert. While the rotary ring rotates, the guide bolts are moved along the groove, similar to a sliding block guide. The rotation movement of the rotary ring is transmitted to the slides by the combination of the curved groove in the rotary ring and the straight groove in the mold insert, such that the slides can be driven to and fro in a linear movement in the rail guide. Thus, each slide can have its own defined course of movement. In a preferred embodiment, four slides can each have their own dedicated direction of movement. In the case of a plurality of slides, this additionally has the effect that each slide acquires a specific curve profile and, in this way, movements that are different in terms of time, length and direction are possible with just one common drive.

In the prior art, the slides are simply guided linearly and, for example at the time of demolding, are moved outward. According to the invention, however, a rotation movement takes place that is converted into a linear movement. The bearing of the movement lies here between the rotary assembly and the mold insert, thereby permitting optimal guiding and centering and force transmission. By virtue of the common movement of a plurality of slides simultaneously, and the mold region around the center of the drive ring, the tool has a very compact configuration.

Further embodiments of the tool, and some of the advantages associated with these embodiments and with further embodiments, are set forth in the following detailed description and will be better understood by reference to the accompanying figures. Items or parts thereof that are substantially identical or similar can be provided with the same reference signs. The figures are purely a schematic representation of an embodiment of the invention.

BRIEF DESCRIPTION OF THE DRAWING FIGURES

In the figures:

FIG. 3b shows a sectional view B-B through a part of the mold insert according to FIG. 3a;

FIG. 6b shows a sectional view C-C through a part of the mold insert according to FIG. 6a;

FIG. 7b shows a sectional view D-D through a part of the mold insert according to FIG. 7a;

FIG. 8b shows a sectional view E-E through a part of the mold insert according to FIG. 8a;

DETAILED DESCRIPTION

Figure 1A:
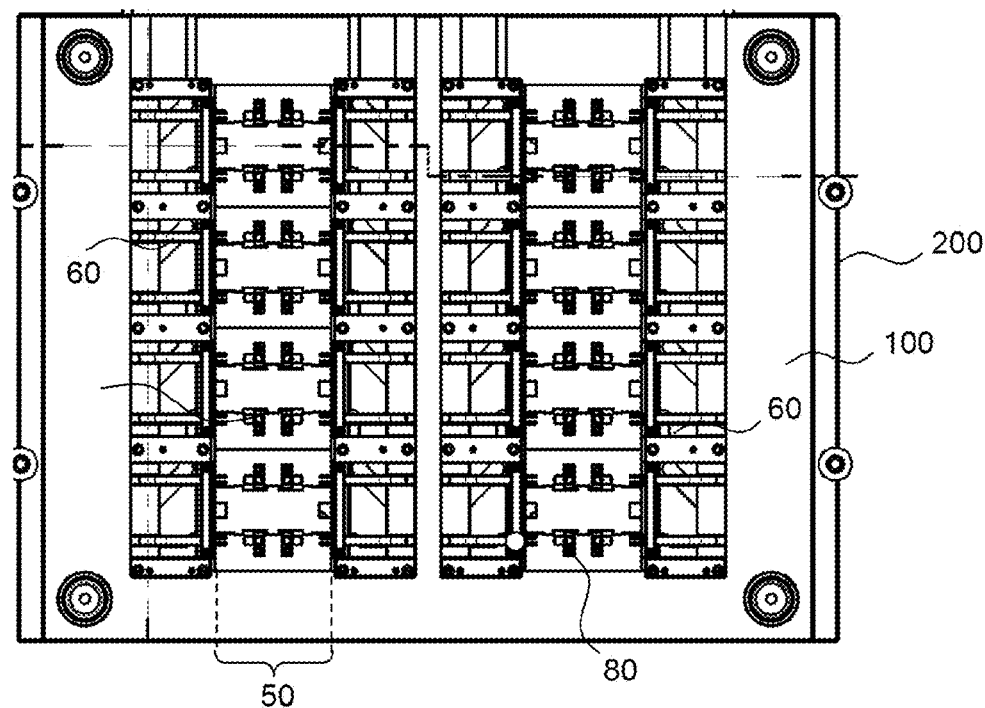
FIG. 1a shows a schematic front view of an ejector component for the injection molding of plastic parts according to the prior art.

FIG. 1a shows an ejector component 200 according to the prior art which, on a mold insert support platen 100, has two rows of mold inserts 50 with mold cavities 80 and, arranged alongside each of these, respective slides 60. The mold cavities 80 lie, per component half, in two rows arranged parallel to each other. The slides 60 are in each case arranged to the left and right of the rows, such that the slides 60 are guided inward from the outside in order to cover the molded part (present in cavity 80). There are eight mold inserts 50, each with four mold cavities 80, such that 36 molded parts can be formed at the same time.

Figure 1B:
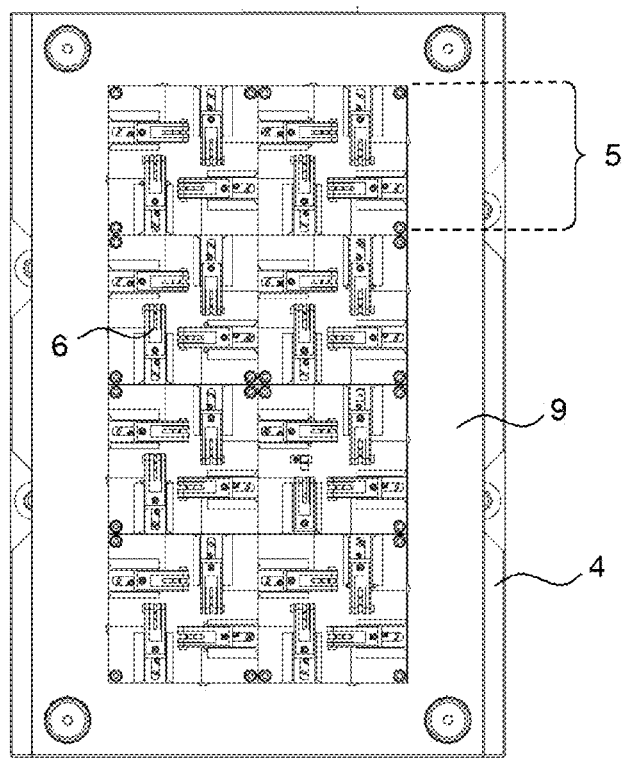
FIG. 1b shows, by way of comparison thereto, a front view of the ejector component according to the invention.
Figure 2:
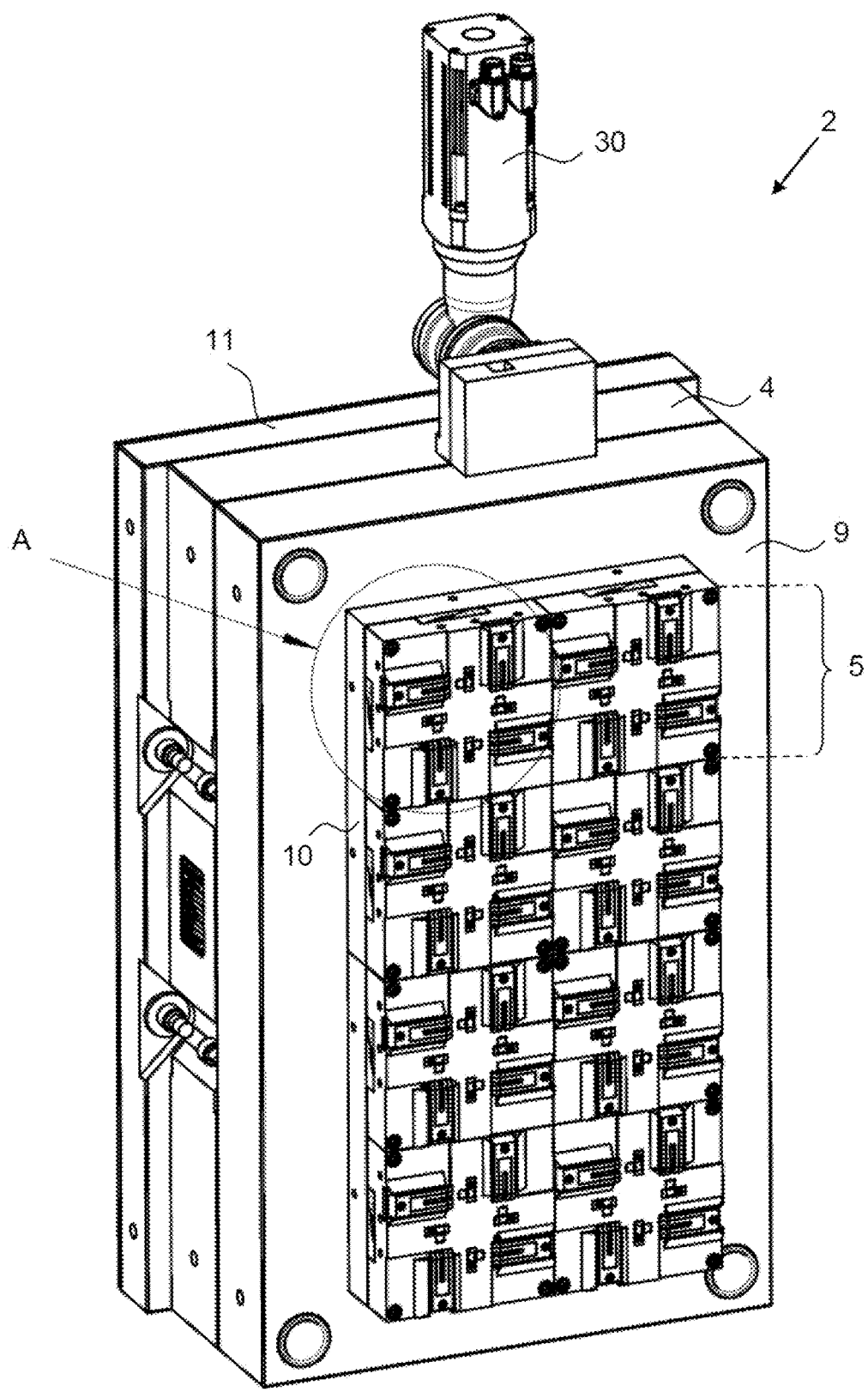
FIG. 2 shows a perspective view of the ejector component according to the invention in an injection molding position.
Figure 9:
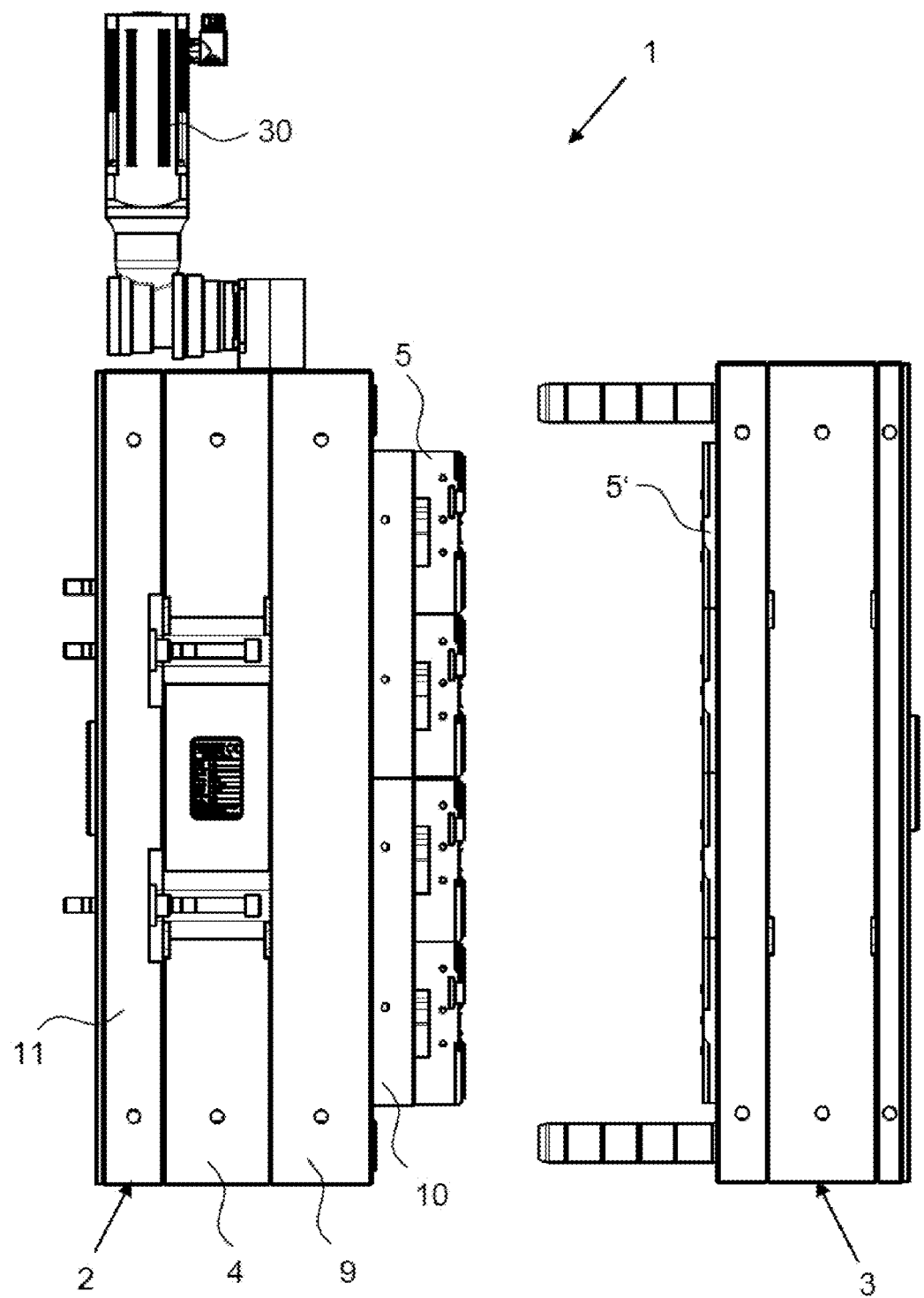
FIG. 9 shows a side view of a tool according to the invention in an opened state.

FIGS. 1b and 2 show an ejector component 2 according to the invention, which has eight mold inserts 5 and which, compared to the prior art according to FIG. 1a, is narrower by approximately half. The ejector component 2 interacts with a nozzle component 3 in a tool 1, as FIG. 9 shows. When the ejector component 2 is brought into a closed state with a nozzle component 3, a complete mold cavity for the injection molding of the plastic parts is formed from the mold cavities 8 in the mold inserts 5 of the ejector component 2 and from the complementary cavities in the complementary inserts 5' of the nozzle component 3. The nozzle component 3 can be moved toward and away again from the ejector component 2, or vice versa. In the examples of a tool according to the invention that are described below in connection with the figures, the mold inserts with the slides and their drive are present on the ejector component, which constitutes a preferred configuration in particular in the variant with covering slide. Although not shown in the figures, the claimed scope of protection also covers designs of a tool in which the mold inserts or complementary inserts of the nozzle component have the slides along with the drive, which are then assigned to the complementary cavities.

The ejector component 2 has a frame plate 4, to which a mold plate 9 is connected that holds an insert platen 10 on which the mold inserts 5 are secured. The insert platen 10 houses the drive rings 12 for slides 6 and mold inserts 5, wherein further drive components leading to the motor 30, such as the drive rod 24 (cf. FIG. 5a), are housed in the mold plate 9. If appropriate, however, the drive components can also be housed in the frame plate 4. The insert platen 10 is a plate created for easier handling. In contrast to the examples shown, it is possible to do without an insert platen, and the entire drive (drive rings and drive components) can be integrated in a mold plate or frame plate. The mold inserts 5 have, alongside the slides 6, associated mold cavities 8 (cavities for short). The frame plate 4 is located on that side of the ejector component 2 directed away from the mold cavities 8 and is connected to a rear mold plate 11 which holds the ejector component 2 and secures it in a suitable manner to a mount. A motor 30 is arranged above the frame plate 4.

Figure 3A:
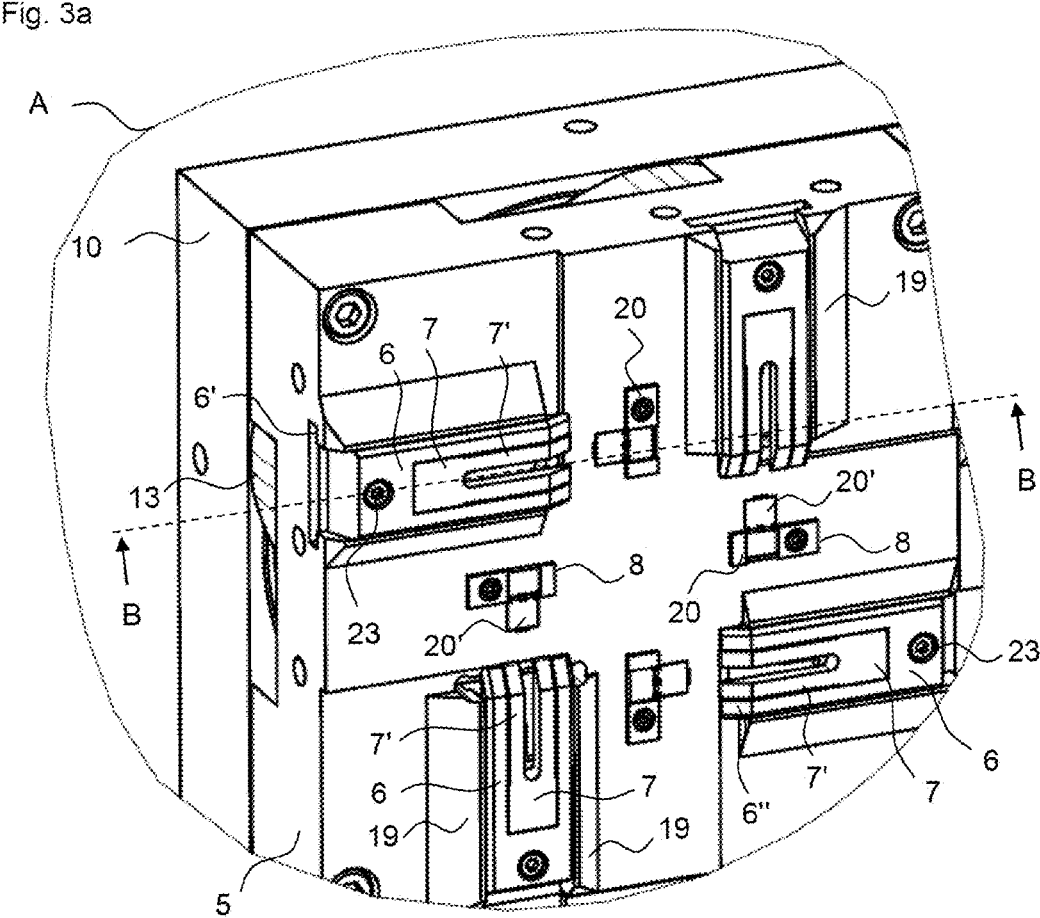
FIG. 3a shows a detail A of a mold insert with slides according to FIG. 1b.
Figure 3B:
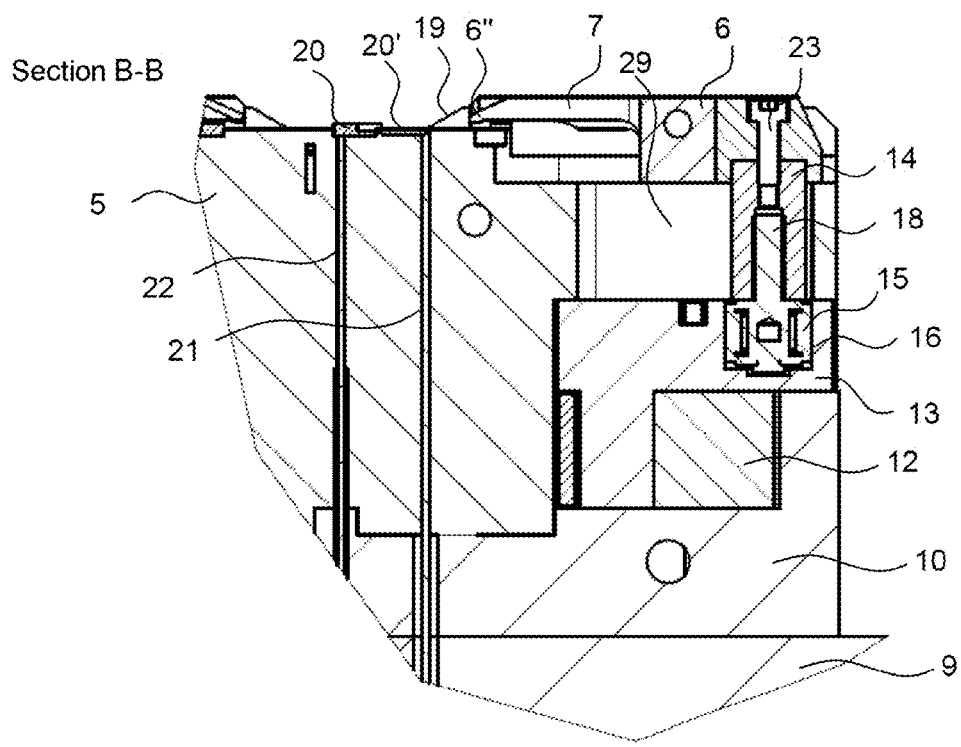

As is shown inter alia in FIG. 3a (detail A from FIG. 2) and FIG. 3b (section B-B from FIG. 2), the mold inserts 5 have the four slides 6 for covering plastic components. Four mold cavities 8 per mold insert 5 are arranged in the central region on imaginary intersecting lines and form the mold region. Each mold cavity 8 is assigned a slide 6, such that they form a pair.

The slides 6 arranged on each mold insert 5 are arranged movably over the cavity-side surface of the mold insert 5 and are fork-shaped. Each slide 6 has a slide fork 7 with slide fork tines 7'. Moreover, to each longitudinal side, each slide 6 has a guide element 6', which is guided laterally in a rail guide 19. The rail guide 19 is the counterpart guide element and is configured as a groove in which the guide element 6' engages, with sides of triangular cross section. The rail guide 19 takes up the movement forces of the slide 6 during the movement and permits linear guiding of the slide 6.

The slide 6, facing toward the mold cavity 8, is flattened forward toward its base and forms a slide tip 6", which is rounded at the front end in order not to damage the molded parts 20. The slides 6 are arranged on the mold insert 5 in such a way that each tip 6" faces a slide side at right angles, such that four slides 6 result in an arrangement on circle tangents or chords, e.g., in a square. The tips 6" are in this case always directed toward the cavities 8 and oriented perpendicular thereto. The slides 6 and the cavities 8 are arranged equidistant to each other in the mold insert 5. The arrangement also results from a specific reference to a drive component (see below).

Inside the mold insert 5, ejector pins 21, 22 are arranged underneath the cavities 8 and can be driven out of the mold insert 5, perpendicularly with respect to the cavity-side surface of the mold insert 5, in order to release the finished molded part 20 from the cavities 8 and finally eject it.

To be able to move the slide 6, an actuation device is provided, such as is shown in FIGS. 3b, 4, 5a and 5b.

Each slide 6 is connected to a connection bolt 14 via a screw union 23. The connection bolt 14 is moreover screwed via the screw union 23 onto a mandrel 18, which extends downward into the mold insert 5. The mandrel 18, hence also the connection bolt 14, opens into a roller bearing 15.

Figure 4:
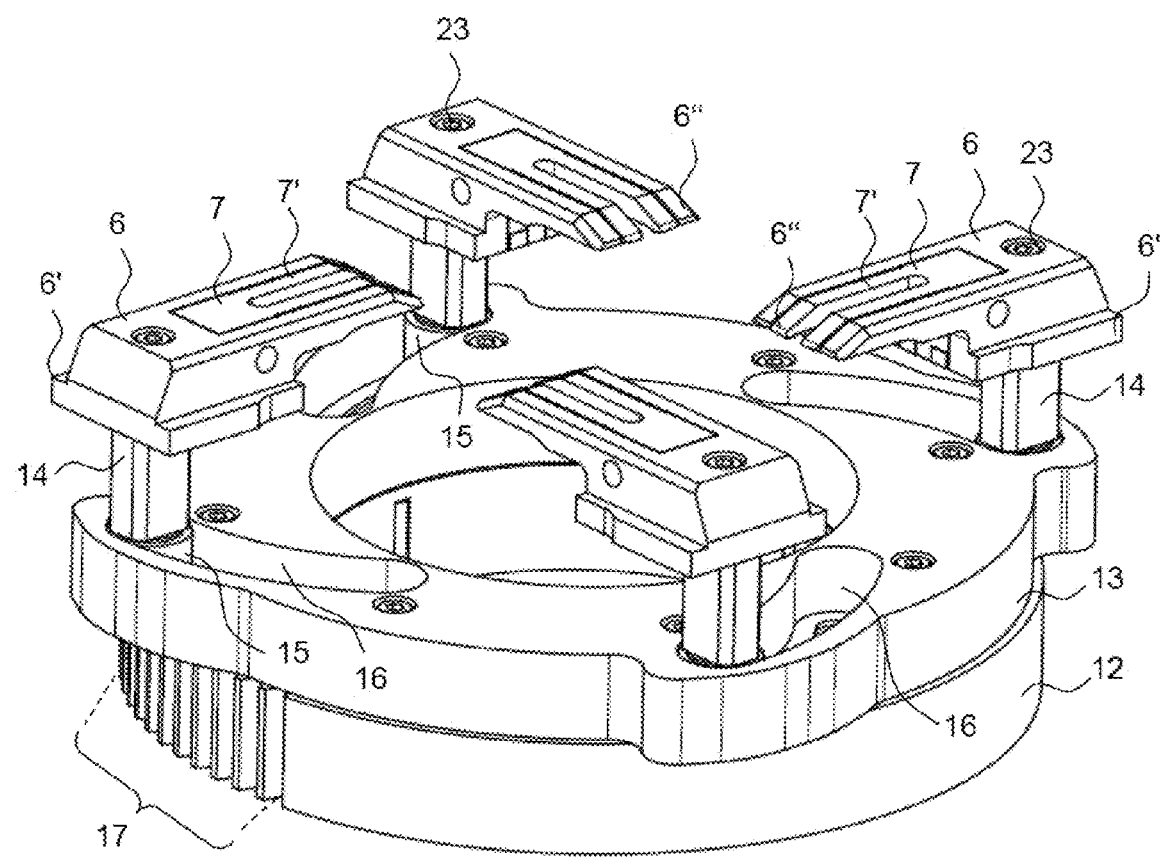
FIG. 4 shows a perspective view of the drive ring including rotary ring and slide.

The actuation device has a drive ring 12, which has at least one toothed portion 17, as shown in FIG. 4. Rigidly connected to the drive ring 12 is a rotary ring 13, which has four grooves 16 in each of which a roller bearing 15 of the slides 6 is movably mounted. The grooves 16 are curved inward in an arc shape. The radius of curvature corresponds to the radius of the rotary ring 13, but is arranged with an offset, such that a movement of the rotary ring 13 has the result of guiding the connection bolt 14 in the direction of the center of the rotary ring. The movement is limited by the length of the groove 16.

Figure 5A:
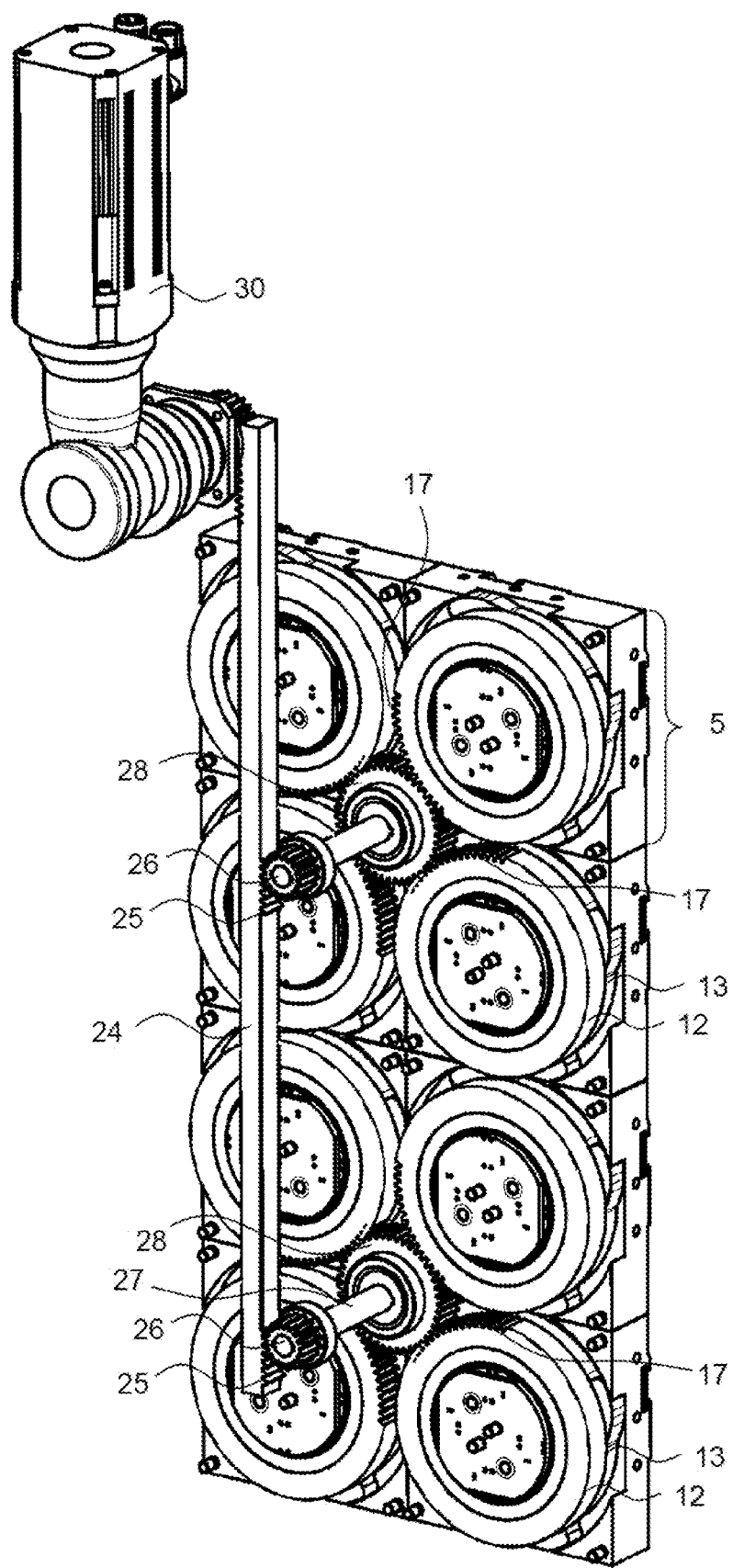
FIG. 5a shows a perspective rear view of the ejector component with drive rod.
Figure 5B:
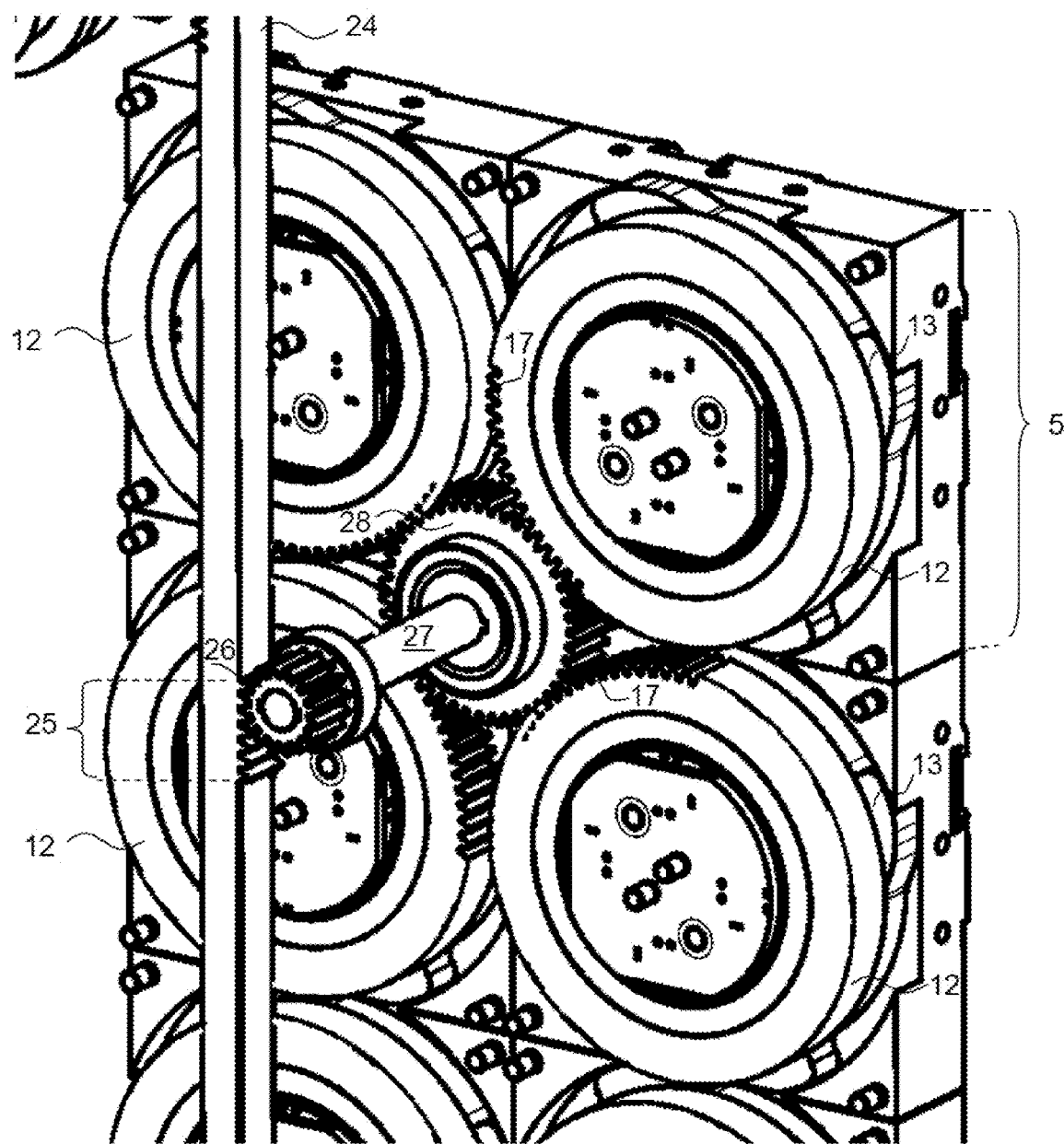
FIG. 5b shows a perspective detail of the connection between drive rod and drive ring.

The toothed portion 17 of the drive ring 12 is in engagement with the drive arranged to the rear of the mold insert support platen 10 (see FIGS. 5a and 5b). For this purpose, a centrally guided drive rod 24 can be provided behind the mold inserts 5 and is operatively coupled to the motor 30. The drive rod 24 is toothed in individual portions 25 in order to introduce force from the motor 30 and introduce torque to further components. The torque introduction from drive rod 24 to drive ring 12 takes place via a shaft 27 which has two toothed wheels 26, 28 at its ends. A first toothed wheel 26 takes over the movement of the drive rod 24 and transmits it to a second toothed wheel 28, which then transmits the movement to the toothed portions 17 of a total of four drive rings 12 (see FIGS. 5a and 5b).

Since the drive ring 12 is rigidly connected to the rotary ring 13, both are driven jointly. During the rotation of the drive ring 12, the movement of the rotary ring 13 is guided to the connection bolt 14, which is mounted with its roller bearing 15 in the groove 16 of the rotary ring 13. The slides 6 connected to the connection bolt 14 are guided in their movement along the rail guide 19 by means of the guide elements 6'. Thus, when the rotary ring 13 rotates, the rotation movement is transmitted to the slides 6 by the combination of the curved groove 16 in the rotary ring 13 and the straight groove 29 in the mold insert 5, such that the slides 6 are driven to and fro in the rail 19.

The course of movement and the subsequent covering of the molded part 20 proceeds as follows: In FIGS. 3a and 3b, a position shortly after the injection of the molded parts 20 is shown; slides 6 are in a starting position, and the ejector pins 21, 22 are retracted. The molded part 20 is already present, and the ejector component 2 is driven away from the corresponding nozzle component 3.

Figure 6A:
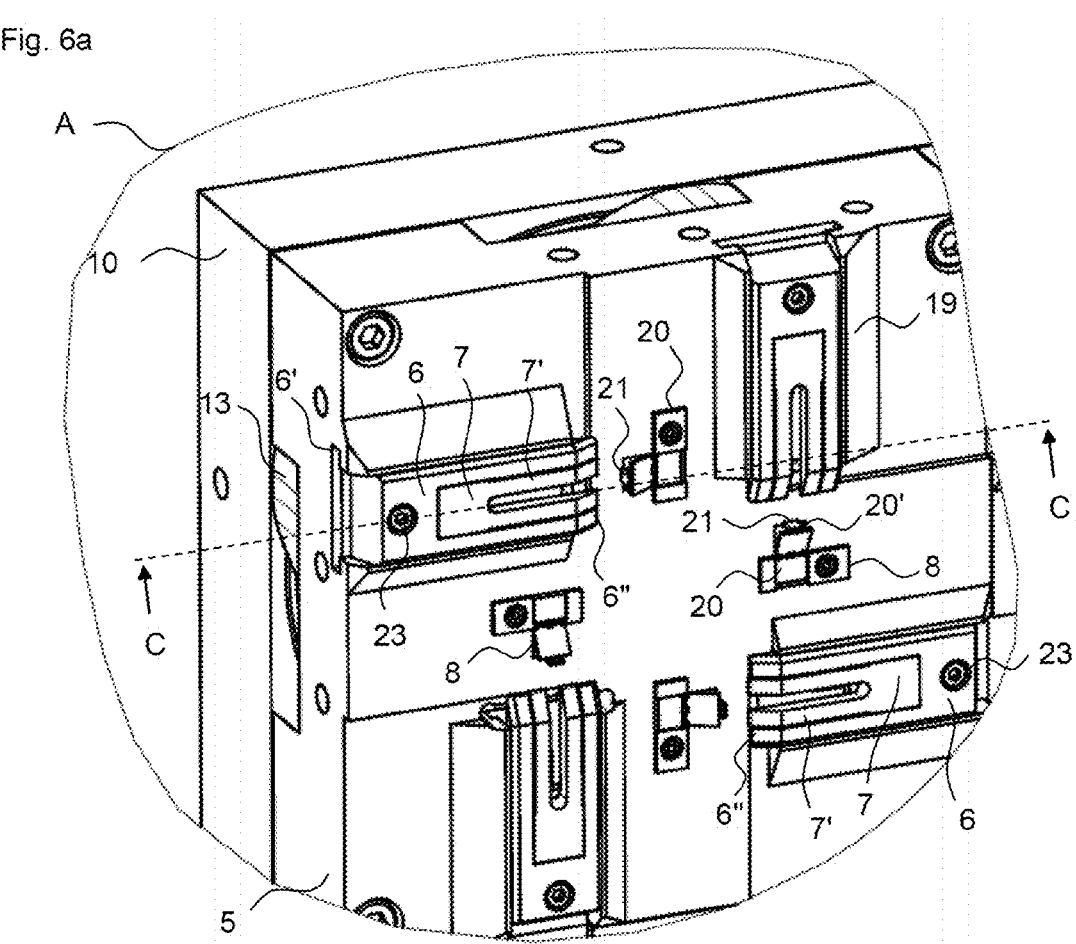
FIG. 6a shows a further detail A of the mold insert with slides in a covering position.
Figure 6B:
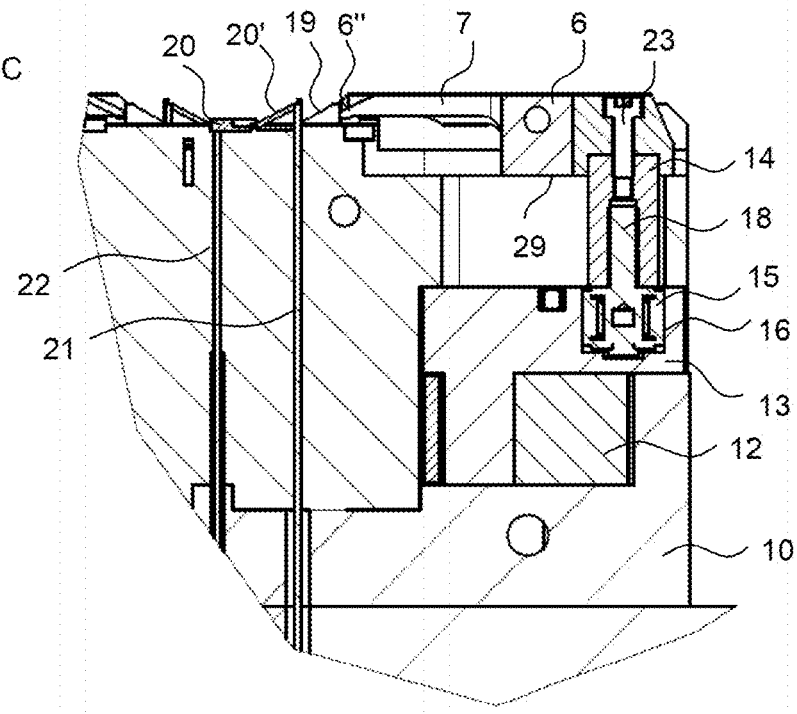

FIGS. 6a and 6b show a covering position, wherein the ejector 21 is deployed in order to lift a second portion 20' (also cover 20') of the molded part 20. The slides 6 are still located in their starting position.

Figure 7A:
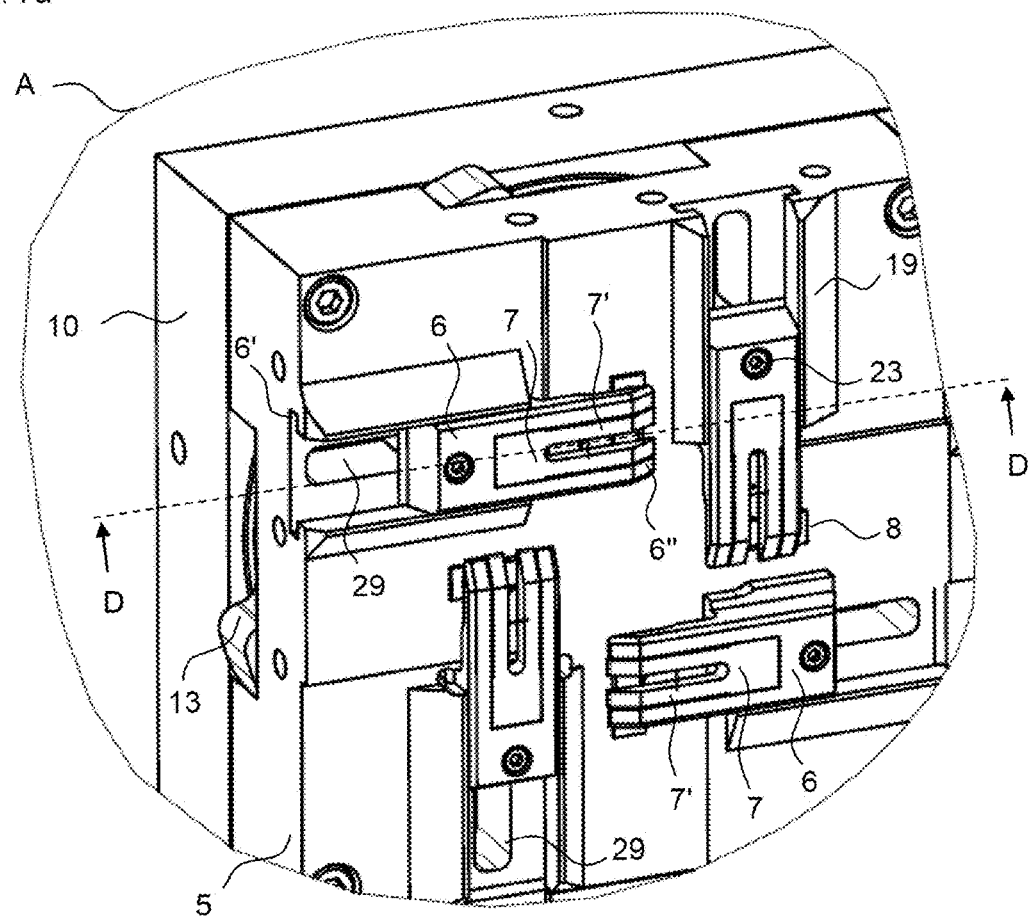
FIG. 7a shows a further detail A of the mold insert with slides in a covering position.
Figure 7B:
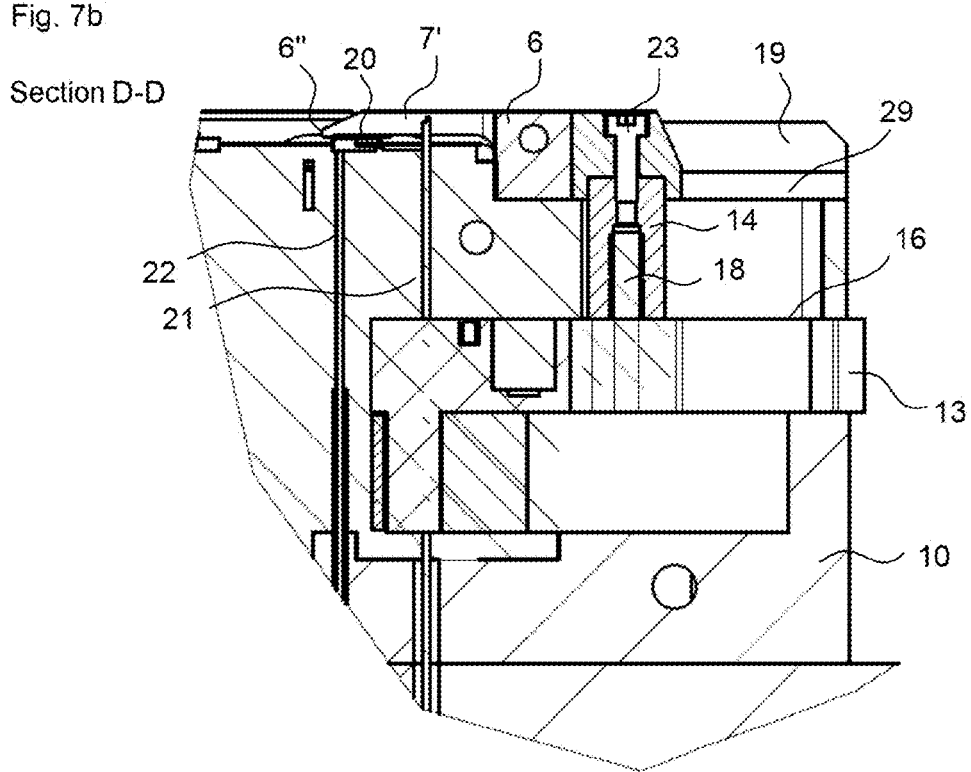

In order to lay the cover portion 20' onto the molded part 20, the motor 30 is started and drives the drive rod 24, the toothed portions 25 of which interact with the toothed wheel 26. The drive ring 12, and with it the rotary ring 13, is set in motion by the transmission of movement as described with reference to FIGS. 5a and 5b. The roller bearing 15 moves in the groove 16, and the connection bolt 14 is moved at the same time in the grooves 16 of the rotary ring 13 and in the grooves 29 of the mold insert 5. The slide 6 is moved linearly forward by means of the rail guide 19 and the guide elements 6'. The pin-shaped ejector 21 fits into the slide fork 7, such that the fork tines 7' slide past the ejector 21 and thus travel around the latter. The rounded tip 6" of the slide 6 moves under the second portion 20' of the molded part, and the latter slides in the forward movement of the slide 6 along the tip 6" and is entrained in this movement. The connection bolt 14 moves as far as the end of the groove 16, such that the slide 6 travels all the way to an end position, as is shown in FIGS. 7a and 7b. In doing so, the slide 6 travels over the second portion 20' of the molded part 20 and folds same over onto a first portion of the molded part 20, such that both come to lie on each other.

Figure 8A:
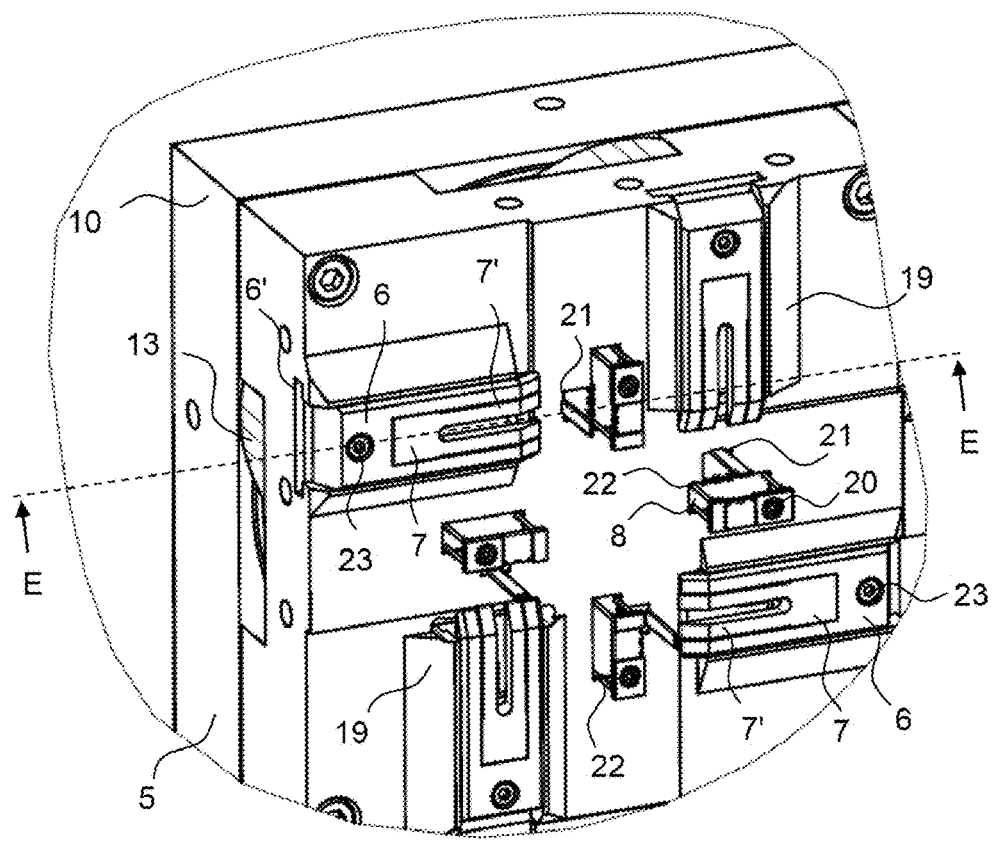
FIG. 8a shows yet another detail of the mold insert with slides in an ejection position.
Figure 8B:
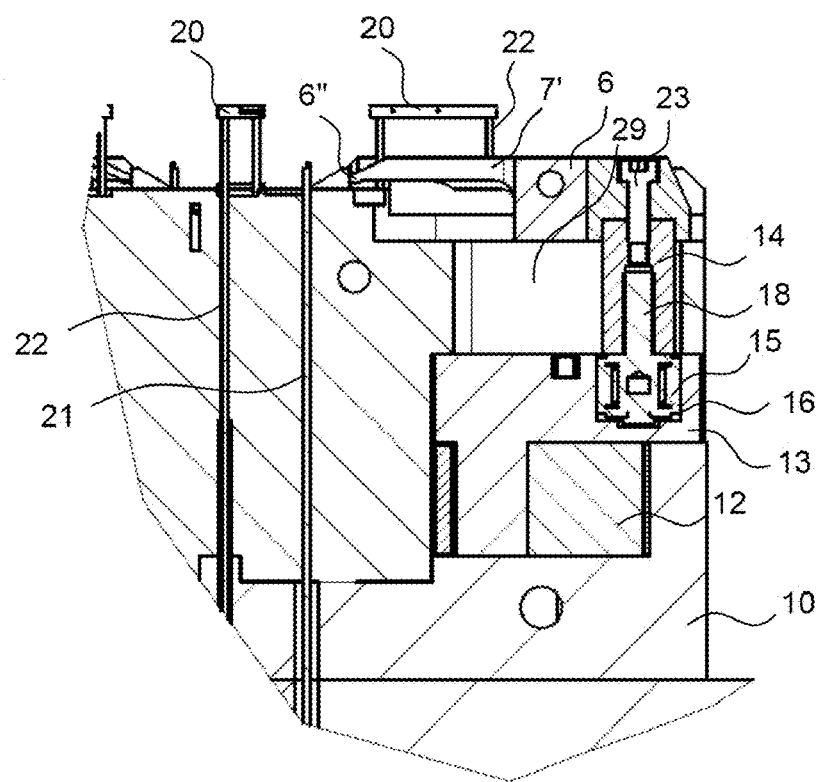

The finished molded part 20 is finally ejected (FIGS. 8a and 8b), for which purpose the slide 6 is moved back to its starting position by reverse movement by means of the drive ring 12. When the molded part 20 is no longer covered by the slide 6, the ejectors 22 move from below onto the molded part 20 and press the latter out of the cavity 8. Thereafter, the molded part 20 is released and is ejected. The ejectors 21, 22 travel back to their starting positions, and a new molded part 20 can be produced.

Figure 10:
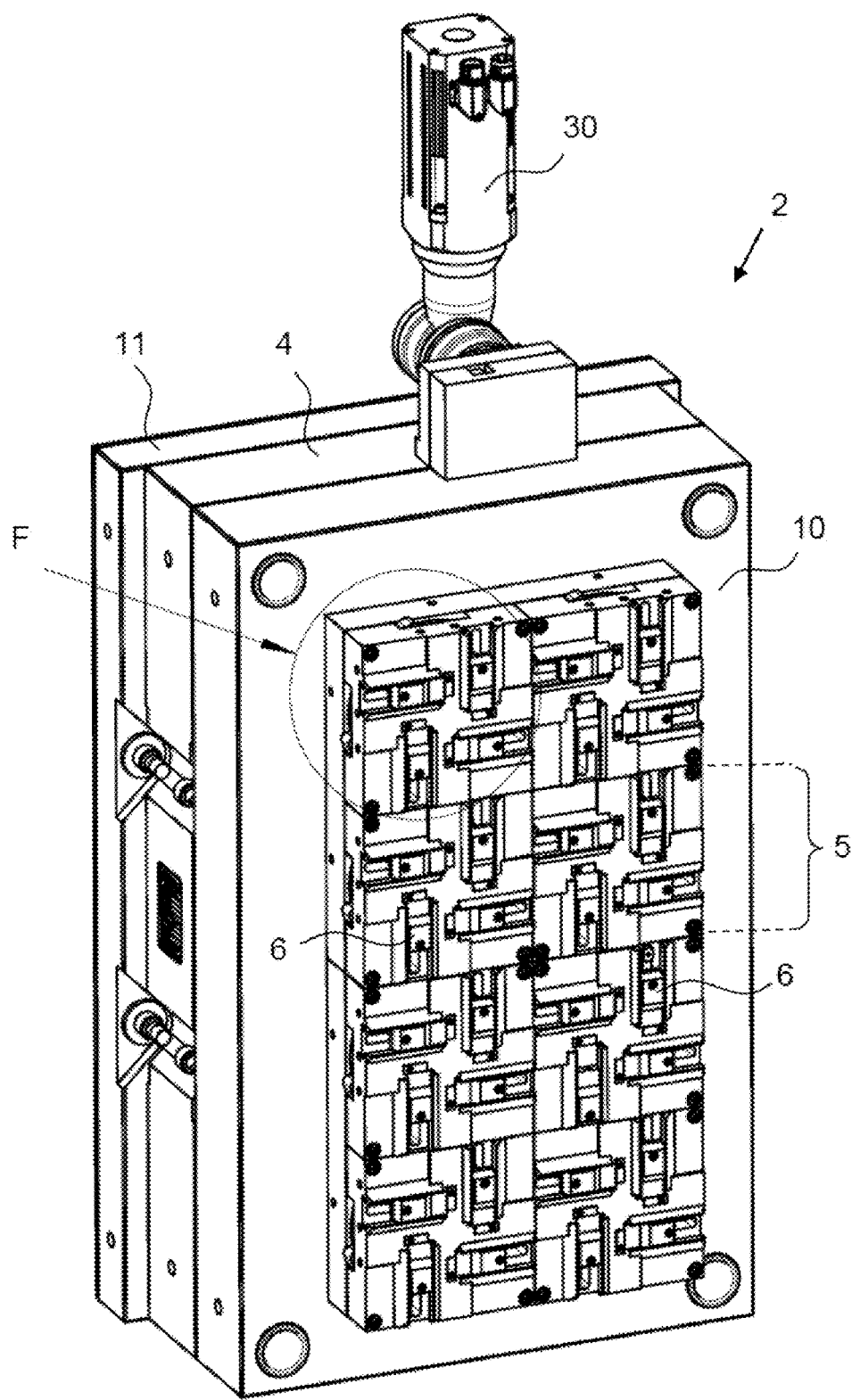
FIG. 10 shows a perspective view of a further ejector component according to the invention with mold slides.
Figure 11:
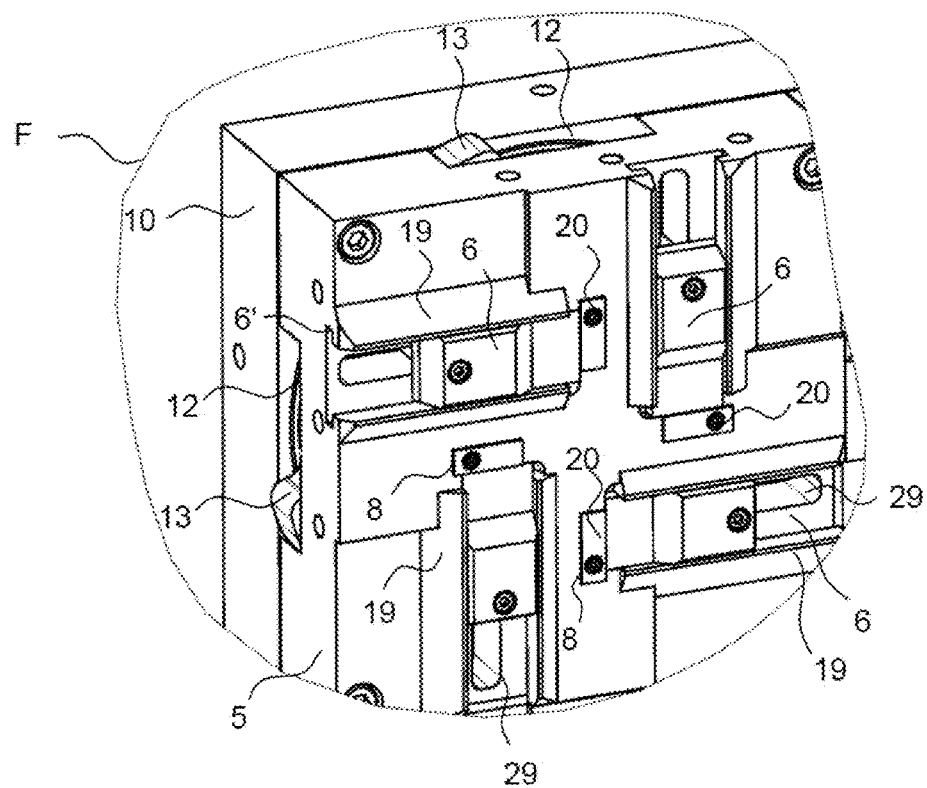
FIG. 11 shows a detail F of a mold insert with slides according to FIG. 10 in an injection position.
Figure 12:
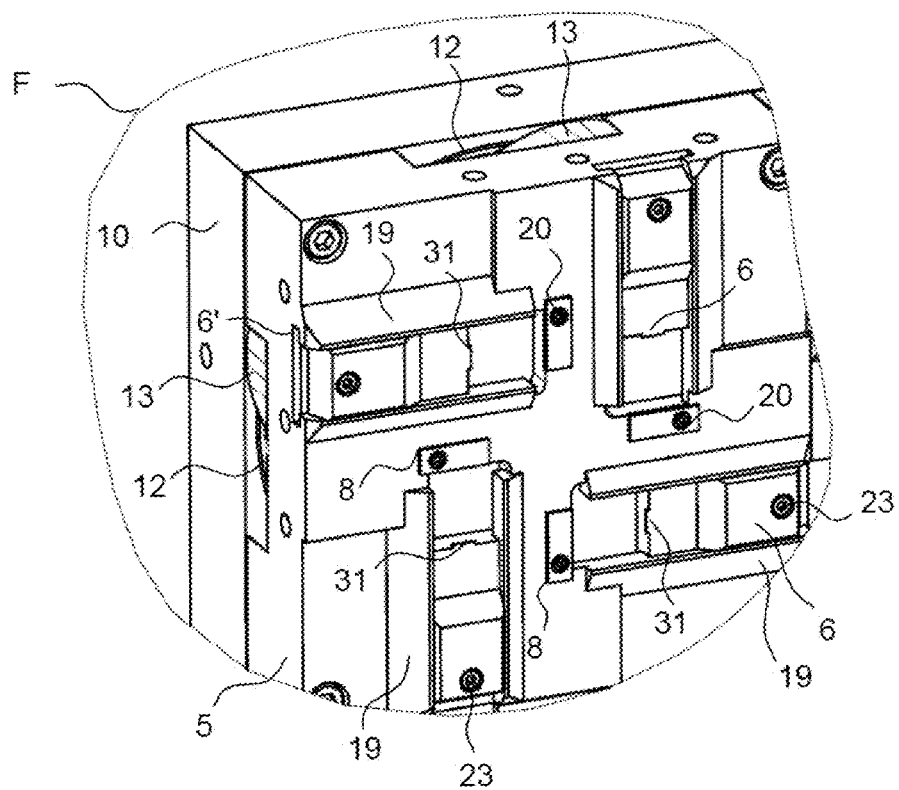
FIG. 12 shows a further detail F of the mold insert in a second position.
Figure 13:
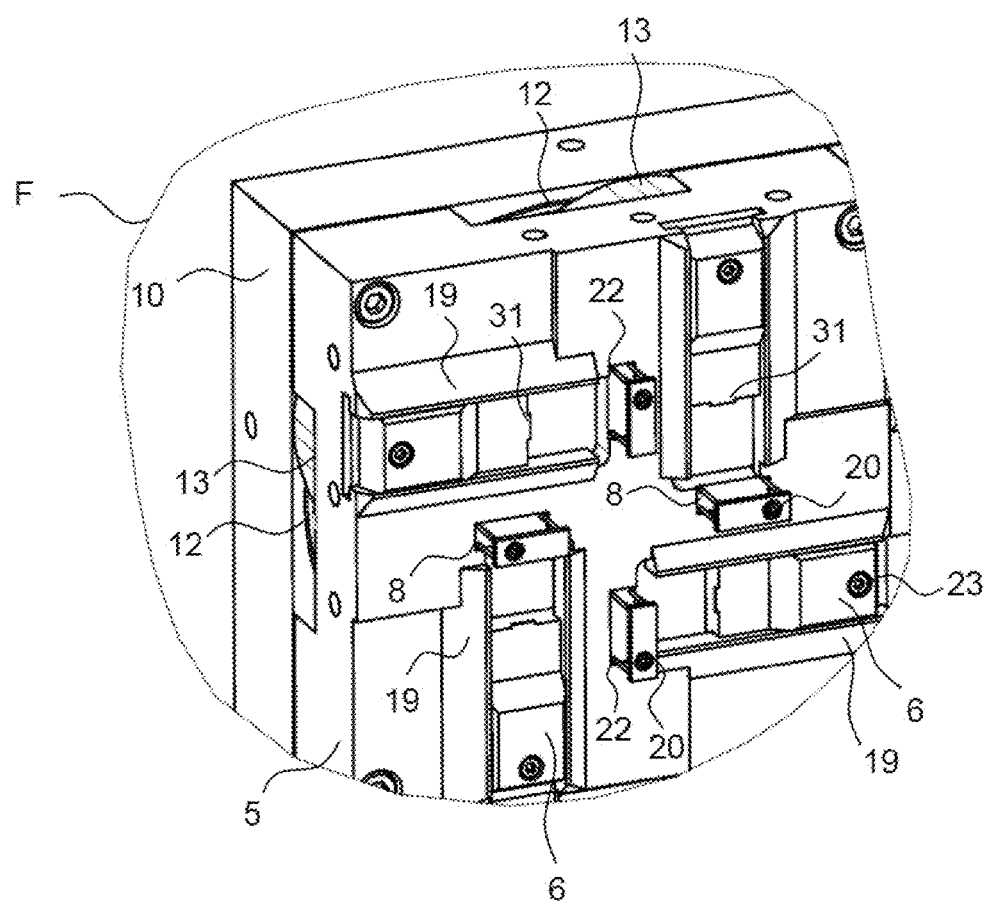
FIG. 13 shows yet another detail F of the mold insert in an ejection position.

FIG. 10 shows a further ejector component 2, which is similar in structure to the one already described but which has modified mold inserts 5. Once again, eight mold inserts 5 are provided, which each carry four slides 6. FIGS. 11 to 13 moreover show a detail F from FIG. 10, namely a closer view of a mold insert 5 in different positions.

FIG. 11 shows the mold insert 5 in the injection molding position, the slide 6 being advanced as far as its end position and being arranged directly next to the cavity 8 which forms the molded part 20. A portion 31 (see FIG. 12) in the form of a protrusion projects here into the cavity 8 and additionally forms a shaping part for the molded part 20. The groove 29 of the mold insert 5 lies free, and the rotary ring 13 is likewise in abutment position.

The slide 6 is then set in motion and is driven linearly to a first position (starting position) in order to permit the ejection of the molded part 20. FIG. 12 and FIG. 13 show the slide 6 in the ejection position, in which it is moved all the way to the left in the groove 29 in the figure, wherein the rotary ring 13 is located in the counter-abutment position. In FIG. 13, which shows the actual ejection step, the ejector pins 22 are driven out of the cavity-side surface of the mold insert 5 and thus press the molded part 20 out of the cavity 8.

A rotation movement of the drive ring is thus converted by the rotary ring 13 into a linear movement of the plurality of slides 6.

Figure 14:
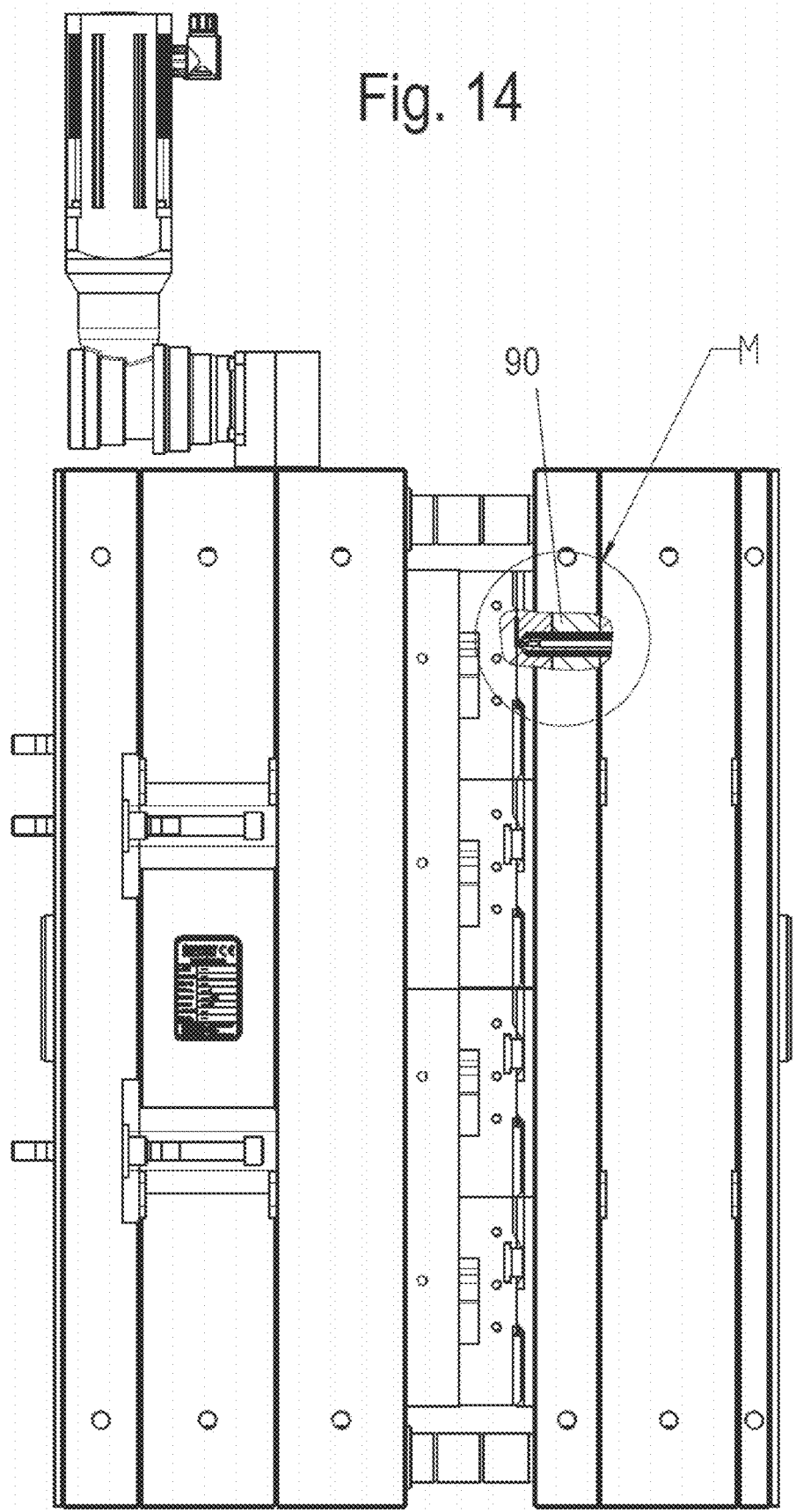
FIG. 14 shows a partially sectioned side view of a tool according to the invention.
Figure 15:
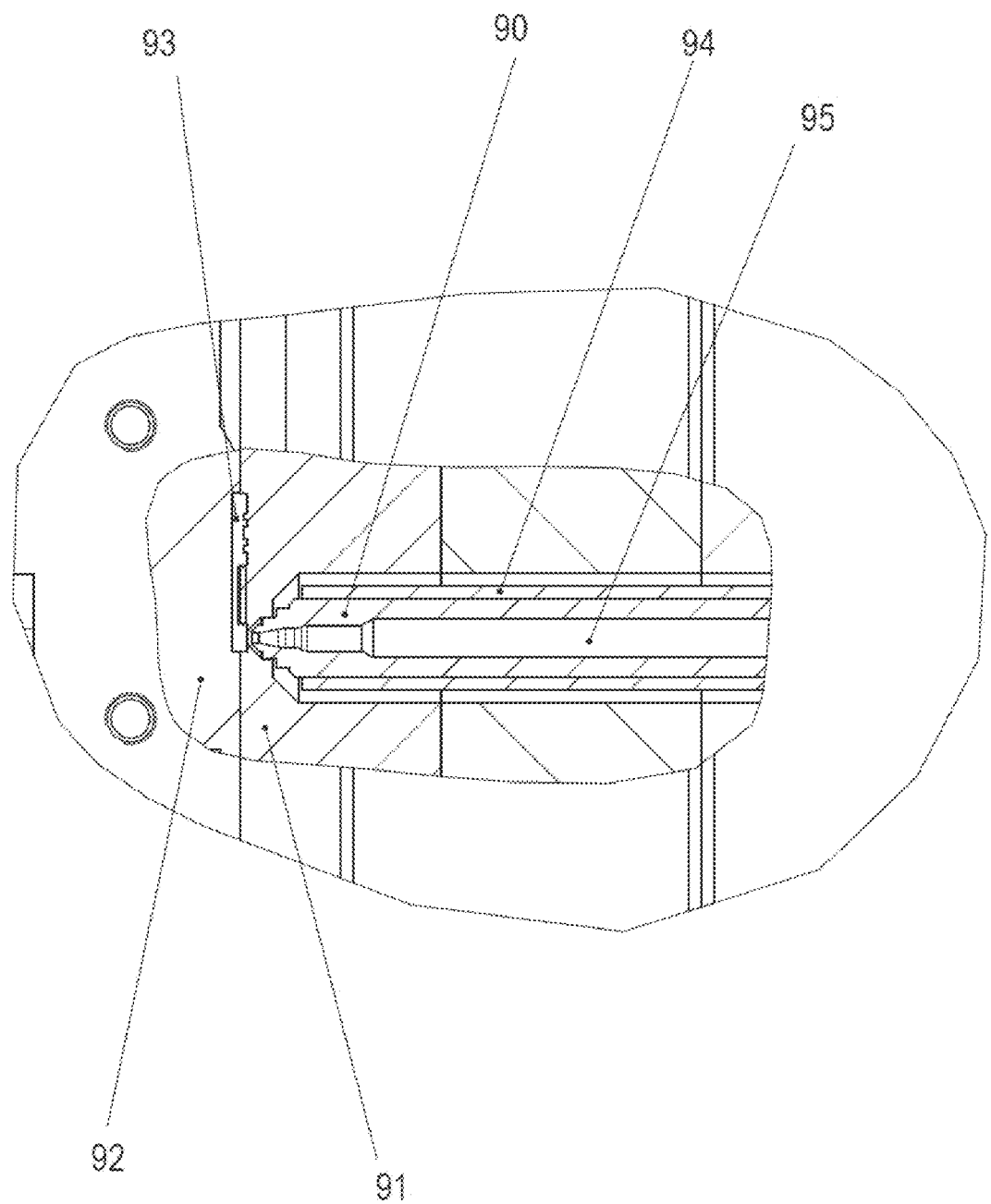
FIG. 15 shows a detail of FIG. 14.

FIG. 14 and FIG. 15 show a side view of a tool according to the invention in analogy to the preceding figures, with the addition of a heated nozzle 90 for dispensing a thermoplastic compound, in the context of an injection molding process, into a cavity in order to form a so-called molding or molded part analogous to the molded part 20.

FIG. 15 shows an enlarged view of the tool detail M with the nozzle 90 from FIG. 14. A first mold insert 91 is arranged on the nozzle-side tool half, and a second mold insert 92 is arranged on the ejector-side tool half of the tool.

In the assembled state of the tool, the mold inserts 91 and 92 form the cavity 93, which can preferably be designed analogously to the mold cavity 8 of FIGS. 1-13. The plastic material is introduced into the cavity 93 through the heated nozzle 90, in particular through a melt channel 95 as part of the nozzle 90. For this purpose, a nozzle heater 94, on the outside in relation to the melt channel 95, is provided in the nozzle 90.

Tools with corresponding nozzles are known per se in the field of injection molding. Especially in injection molding, particular importance is attached to achieving the shortest possible cycle times, and many of the advantages afforded in the production of molded parts in the context of the present invention include the time saved, the automation of work flows, and the low rate of production faults.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 1 tool
2 ejector component
3 nozzle component
4 frame plate
5 mold insert
5' complementary insert
6 slide
6' guide element
6" slide tip
7 slide fork
7' slide tines
8 mold cavity
9 mold plate
10 insert platen
11 rear mold plate
12 drive ring
13 rotary ring
14 connection bolt
15 roller bearing
16 groove of rotary ring
17 toothed portion
18 mandrel
19 counterpart guide element, rail/rail guide
20 molded part
20' molded part cover
21 ejector for cover
22 ejector for molded part
23 screw union for connection bolt
24 drive rod
25 toothed portion of drive rod
26 toothed wheel of drive rod
27 shaft
28 toothed wheel of drive ring
29 groove of mold insert
30 motor
31 portion/protrusion
50 mold insert
60 slide
80 mold cavity
100 mold insert support platen
200 ejector component

The invention claimed is:

1. A tool for the injection molding of plastic molded parts, the tool comprising:
    two tool halves, which are moveable in relation to each other, wherein the two tool halves include is a nozzle component and an ejector component;
    wherein a first of the two tool halves comprises
        a mold plate carrying at least one mold insert, which has a multiplicity of mold cavities, or
        a mold plate with a mold insert support platen, which carries at least one mold insert with a multiplicity of mold cavities,
    wherein the multiplicity of mold cavities of the first of the two tool halves are configured to form molded parts in conjunction with complementary cavities present on a second of the two tool halves,
    wherein the mold insert of each mold cavity of the multiplicity of mold cavities is assigned a corresponding one of a plurality of slides, each of the plurality of slides is arranged movably between two positions over or in a cavity-side surface of the mold insert,
    wherein each of the plurality of slides has at least one guide element in engagement with a counterpart guide element in the mold insert,
    wherein a connection bolt extends from each of the plurality of slides in a direction of the mold plate or of the mold insert support platen and each of the plurality of slides is guided in a guide groove of a rotary ring, wherein a plurality of connection bolts of the plurality of slides are arranged circumferentially along the circumference of the rotary ring, distributed in a corresponding number of guide grooves, and
    wherein the rotary ring is connected to a drive ring arranged on the mold plate or the mold insert support platen.

2. The tool of claim 1, wherein the first of the two tool halves is the ejector component, and the second of the two tool halves is the nozzle component, wherein the nozzle component comprises a heatable nozzle.

3. The tool of claim 1, wherein the molded parts are one-piece molded parts, and wherein
- each of the plurality of slides is configured to move the one-piece molded part, or
- the one-piece molded part has at least two portions, and at least one portion of the at least two portions is connected by a hinge to a second portion of the at least two portions, wherein each of the plurality of slides is configured to pivot the second portion connected to the hinge, or
- each of the plurality of slides includes a portion configured to project into a corresponding one of the multiplicity of mold cavities during the injection molding.

4. The tool of claim 1, wherein the drive ring is operatively coupled to a motor, and wherein the drive ring has at least one toothed portion, which meshes with a drive rod of the motor.

5. The tool of claim 1, wherein the multiplicity of cavities define a top side, and a drive comprising at least the drive ring is arranged perpendicularly underneath the multiplicity of cavities, wherein the rotary ring converts a rotation movement of the drive ring into a linear movement of each of the plurality of slides.

6. The tool of claim 2, wherein
- each of the plurality of connection bolts has a roller bearing, which is guided in the guide groove of the rotary ring, or
- each of the plurality of slides, at an end of each of the plurality of connection bolts directed away from an end guided in the guide groove, has a horizontally extending slide part with a slide tip having a slide fork with slide tines.

7. The tool of claim 1, wherein each of the plurality of slides is mounted linearly movably in a rail guide, and the mold insert has grooves corresponding in their orientation to the rail guide, wherein the plurality of connection bolts of the plurality of slides are guided in the grooves.

8. The tool of claim 1, wherein the plurality of connection bolts of the plurality of slides are arranged at equal distances circumferentially along a circumference of the rotary ring, distributed in a corresponding number of guide grooves, wherein the at least one guide element and the counterpart guide element form a rail guide.

9. The tool of claim 6, wherein the ejector component has ejector pins which, after the molded part has been cast, are drivable out from a cavity-side surface of the mold insert, wherein each of the plurality of slides is configured to travel around the ejector pins in an ejection state.

10. The tool of claim 9, wherein the slide fork is arranged such that the slide tines travel around the ejector pins in the ejection state.

11. A method for moving a plurality of slides of a first of two tool halves of a tool for the injection molding of plastic molded parts, the tool comprising the two tool halves, which are moveable in relation to each other, wherein the two tool halves include is a nozzle component and an ejector component, wherein the first of the two tool halves comprises a mold plate carrying at least one mold insert, which has a multiplicity of mold cavities, or a mold plate with a mold insert support platen, which carries at least one mold insert with a multiplicity of mold cavities, wherein the multiplicity of mold cavities of the first of the two tool halves are configured to form molded parts in conjunction with complementary cavities present on a second of the two tool halves, wherein the mold insert of each mold cavity of the multiplicity of mold cavities is assigned a corresponding one of a plurality of slides, each of the plurality of slides is arranged movably between two positions over or in a cavity-side surface of the mold insert, wherein each of the plurality of slides has at least one guide element in engagement with a counterpart guide element in the mold insert, and wherein a connection bolt extends from each of the plurality of slides in a direction of the mold plate or of the mold insert support platen and each of the plurality of slides is guided in a guide groove of a rotary ring, wherein a plurality of connection bolts of the plurality of slides are arranged circumferentially along the circumference of the rotary ring, distributed in a corresponding number of guide grooves, and wherein the rotary ring is connected to a drive ring arranged on the mold plate or the mold insert support platen, the method comprising:
- rotating the drive ring arranged on the mold plate or mold insert support platen together with the connected rotary ring;
- guiding the plurality of connection bolts, which are connected to the plurality of slides, in the corresponding guide grooves of the rotary ring; and
- driving the plurality of slides, by the at least one guide element guided in the counterpart guide element, from a starting position to an end position.

12. A method for pivoting a portion of a one-piece molded part present in an ejector component, wherein the portion is a second portion of the one-piece molded part which is connected to a first portion of the one-piece molded part via a hinge, the method comprising:
- a) deploying an ejector pin, which is arranged under the second portion, to release the second portion from the mold cavity;
- b) moving a slide from a starting position by rotating the drive ring arranged on the mold plate or mold insert support platen together with the connected rotary ring, guiding a connection bolt, which is connected to the slide, in corresponding guide grooves of the rotary ring, and driving slide, by at least one guide element guided in a counterpart guide element, from the starting position to the end position, wherein
  - a slide tip of the slide moves under the second portion of the molded part and sets the second portion of the molded part upright, and,
  - during a continuous onward movement of the slide to the end position, slide tines of the slide travel around the ejector pin and the slide tip folds the second portion of the molded part over, and the slide tines travel over the second portion of the molded part such that the second portion of the molded part comes to lie on the first portion of the molded part,
- c) moving the slide back to the starting position by rotating the drive ring in an opposite direction to step b), before ejection of the molded part takes place by deployment of the ejector pin, which is present under the first portion of the molded part and thus release the molded part from the mold cavity.

* * * * *